(12) United States Patent
Scelsi et al.

(10) Patent No.: US 8,573,369 B2
(45) Date of Patent: Nov. 5, 2013

(54) METHODS AND BRAKE DISC ASSEMBLIES TO INCREASE THE USE OF FRICTION MATERIAL

(75) Inventors: Anthony Scelsi, Elkhart, IN (US); Todd M. Menzie, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 1686 days.

(21) Appl. No.: 11/635,284

(22) Filed: Dec. 7, 2006

(65) Prior Publication Data

US 2008/0135680 A1 Jun. 12, 2008

(51) Int. Cl.
*F16D 55/36* (2006.01)

(52) U.S. Cl.
USPC .......... 188/71.5; 192/70.14; 192/113.21; 188/71.4; 188/218 XL; 188/18 A; 188/252

(58) Field of Classification Search
USPC ...... 188/251, 71.5, 71.4, 218 XL, 18 A, 71.6, 188/252; 192/70.14, 113.21
See application file for complete search history.

(56) References Cited

U.S. PATENT DOCUMENTS

| | | | |
|---|---|---|---|
| 2,987,143 A * | 6/1961 | Fuchs et al. | 188/71.5 |
| 3,473,637 A | 10/1969 | Rutt | |
| 3,618,729 A | 11/1971 | Ely et al. | |
| 3,639,197 A | 2/1972 | Spain | |
| 3,712,427 A | 1/1973 | Cook et al. | |
| 3,724,625 A | 4/1973 | Rohrlack et al. | |
| 3,726,374 A | 4/1973 | Warren et al. | |
| 3,746,139 A | 7/1973 | Bok et al. | |
| 3,951,240 A * | 4/1976 | Dowell et al. | 188/71.5 |
| 4,013,147 A * | 3/1977 | Anderson | 188/218 XL |
| 4,173,269 A | 11/1979 | Craig | |
| 4,804,071 A * | 2/1989 | Schultz et al. | 188/71.5 |
| 5,085,295 A | 2/1992 | Wautelet et al. | |
| 5,284,232 A * | 2/1994 | Prud'Homme | 192/70.21 |
| 5,503,254 A * | 4/1996 | Fisher et al. | 188/71.5 |
| 5,588,507 A | 12/1996 | Beardsley et al. | |
| 5,613,578 A | 3/1997 | Moseley et al. | |
| 5,769,185 A | 6/1998 | Main et al. | |
| 5,779,006 A | 7/1998 | Hyde et al. | |
| 5,803,210 A * | 9/1998 | Kohno et al. | 188/73.1 |
| 6,006,885 A * | 12/1999 | Borgeaud et al. | 192/107 R |
| 6,327,765 B2 | 12/2001 | Niespodziany et al. | |
| 6,340,075 B1 * | 1/2002 | Bok et al. | 188/71.7 |
| 2002/0179382 A1 | 12/2002 | Fryska et al. | |
| 2005/0126869 A1 | 6/2005 | Yeh | |

FOREIGN PATENT DOCUMENTS

| | | |
|---|---|---|
| EP | 0 833 071 A2 | 4/1998 |
| EP | 0 896 165 A1 | 2/1999 |
| GB | 2057609 | 4/1981 |
| GB | 2 271 155 A | 4/1994 |
| WO | WO-91/09233 A | 6/1991 |

* cited by examiner

*Primary Examiner* — Robert A Siconolfi
*Assistant Examiner* — James Hsiao
(74) *Attorney, Agent, or Firm* — Shumaker & Sieffert, P.A.

(57) ABSTRACT

Methods and brake disc assemblies are disclosed to increase the use of friction material. A disclosed example carbon composite brake disc includes a generally annular body having an opening, an outer axial surface, an inner axial surface, a disc thickness extending radially between the outer axial surface and the inner axial surface, and at least one ring extending radially from the outer axial surface to define an outer diameter of the carbon composite brake disc.

18 Claims, 4 Drawing Sheets

METHODS AND BRAKE DISC ASSEMBLIES TO INCREASE THE USE OF FRICTION MATERIAL

FIELD OF THE DISCLOSURE

This disclosure relates generally to brake disc assemblies, and more particularly, to methods and brake disc assemblies to increase the use of friction material.

BACKGROUND

The use of carbon-carbon composite brake discs in aircraft brakes, which also have been referred to in the art as carbon brakes, is well-known in the aerospace industry. Carbon-carbon composite brake discs are manufactured by aircraft wheel and brake manufacturers using a variety of manufacturing methods. These methods generally require lengthy fabrication and densification methods. In recent years, aircraft manufacturers have increasingly specified the use of such carbon-carbon composite brake discs for brakes designed for use with new aircraft models. Typically, the service life of carbon-carbon composite brake discs defines the approximate number of landings during which the brake discs can be used, and is related to the overall cost of using the carbon brakes in an aircraft.

DETAILED DESCRIPTION

In general, example methods and brake disc assemblies disclosed herein to increase the use of friction material may be applied to brake disc that are manufactured from various materials and/or by various manufacturing methods. Additionally, while the examples described herein are described in connection with aircraft braking applications in the aerospace industry, the teachings of this disclosure may also be applicable to a variety of braking applications for different vehicles and/or mechanisms in different industries.

Figure 1:
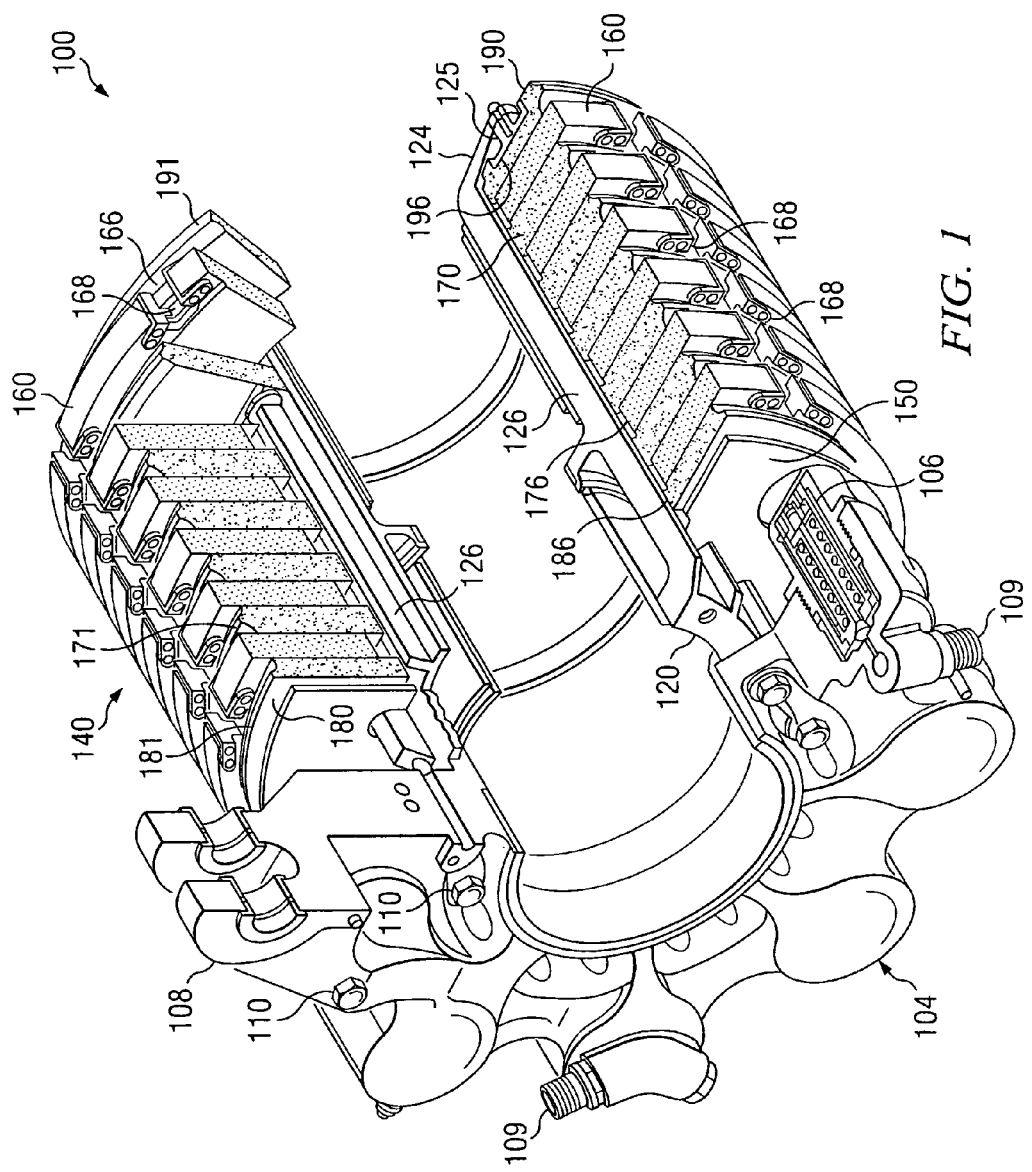
FIG. 1 is a cut-away perspective illustration of an example aircraft carbon brake having an example brake disc assembly with carbon-carbon composite brake discs.

FIG. 1 is a cut-away view of an example aircraft carbon brake 100 and, in particular, a carbon brake having friction material discs made of carbon-carbon composite material. The example aircraft carbon brake 100 includes a piston housing 104 having a plurality of hydraulic pistons 106 located about the circumference of the piston housing 104. It also includes hydraulic fittings 109 for communication with a hydraulic brake actuation system (not shown) of an aircraft (not shown), and a torque take-out arm 108 for attachment to the landing gear (not shown) of the aircraft. A plurality of circumferentially spaced bolts 110 attaches the piston housing 104 to a torque tube 120.

Torque tube 120 includes axially-extending coupling members or splines 126. The torque tube 120 extends horizontally from the piston housing 104 to a backing plate 124. Located about the torque tube 120 and between the pistons 106 and the backing plate 124, are a plurality of friction material discs. These friction material discs form the example heat stack or brake disc assembly 140 of the example aircraft carbon brake 100. The friction material discs of the example brake disc assembly 140 include six rotor discs 160, five example stator discs 170, an example pressure plate disc 180, and an example backing plate disc 190. A metal plate 150 is located adjacent the example pressure plate 180. Each example stator disc 170 includes a radially extended ring 171 of friction material. In a similar manner, the example pressure plate disc 180 includes a radially extended ring 181 of friction material, and the backing plate disc 190 includes a radially extended ring 191 of friction material. In the illustrated example, the stator discs 170, the pressure plate disc 180, and the backing plate disc 190 are stationary, non-rotating discs. Therefore, the example pressure plate disc 180 and the example backing plate disc 190 of FIG. 1 are specific types of stator discs that are located at opposite axial ends of the brake disc assembly 140.

Each of the rotor discs 160 of the illustrated example includes a plurality of spaced-apart slots 166 in its outer circumference. Each of the spaced-apart slots 166 includes therein a metal insert 168. The spaced-apart slots 166 and the metal inserts 168 receive coupling members or drive keys (not shown) either attached to or made an integral part of the aircraft wheel (not shown) at a wheel well opening so that the rotor discs 160 are connected non-rotatably with the wheel. In a similar manner, the example stator discs 170 include at their inner diameter a plurality of spaced-apart slots 176, and the example pressure plate disc 180 includes at its inner diameter a plurality of spaced-apart slots 186. The spaced-apart slots 176 and 186 receive the coupling members or splines 126 of the torque tube 120 so that the example stator discs 170 and the example pressure plate disc 180 are attached non-rotatably to the torque tube 120. The example backing plate disc 190 has pockets 196 that receive torque pads 125 to attach nonrotatably the backing plate disc 190 to the backing plate 124.

In operation, the example aircraft carbon brake 100 (e.g., the assembled piston housing 104, the torque tube 120, and the example brake disc assembly 140) is mounted to an axle (not shown) of an aircraft landing gear (not shown). The torque take-out arm 108 is connected to the landing gear. The piston housing 104 is connected via the fittings 109 to the hydraulic brake actuation system (not shown) of the aircraft. In the example of FIG. 1, when an aircraft operator actuates a brake pedal of the aircraft or when the brakes are operated automatically by the aircraft's hydraulic brake actuation system, hydraulic brake fluid is pressurized to cause the hydraulic pistons 106 to extend from the piston housing 104 and squeeze together the spinning rotor discs 160 and the example stationary stator discs 170 between the example stationary pressure plate disc 180 and the example stationary backing plate disc 190, thereby causing the spinning rotor discs 160 and attached wheel to decelerate and slow down the aircraft until it is brought to a stop or the brakes released. Although described and shown as a hydraulic brake, persons of ordinary skill in the art will understand that the illustrated example aircraft carbon brake 100 can also be implemented as an electric aircraft brake that utilizes electro-mechanical actuators instead of the hydraulic pistons 106 and an electrical actuation system instead of the hydraulic brake actuation system.

In the illustrated example aircraft carbon brake 100 of FIG. 1, the example pressure plate disc 180, the rotor discs 160, the example stator discs 170, and the example backing plate disc 190 of the example brake disc assembly 140 are made of carbon-carbon composite material. Repeated actuation of the example aircraft carbon brake 100 causes the example brake disc assembly 140 to wear until the example pressure plate disc 180, the rotor discs 160, the example stator discs 170, and the example backing plate disc 190 must be replaced with similar discs that have the thicknesses of unworn discs.

In FIG. 1, the example heat stack or brake disc assembly 140 is required to meet various performance requirements for the example aircraft carbon brake 100. For example, during braking the example brake disc assembly 140 must have sufficient mass to absorb predetermined amounts of braking energy in the form of heat and, thus, limit the amount of heat transferred to the adjacent components of the wheel (not shown) and/or the example aircraft carbon brake 100. Also, the example brake disc assembly 140 must be able to absorb a certain amount of braking energy in the form of heat when the brake disc assembly 140 has reached a fully worn condition. Generally, that heat absorption capability is sufficient if the example aircraft carbon brake 100 is able to pass a rejected take-off (RTO) test when the example brake disc assembly 140 is in the fully worn condition. However, the mass required for an RTO of the fully worn example brake disc assembly 140 limits the amount of friction material that may be used or worn during the usable or service life of the example brake disc assembly 140. (The service life is commonly referred to as the landings per overhaul (LPO) of the example brake disc assembly 140.) Therefore, it is desirable to maximize the mass or volume of the example brake disc assembly 140 so that more friction material can be worn away during the service life of the example brake disc assembly 140 to increase the LPO while still retaining the amount of mass required for a worn brake RTO.

Figure 2:
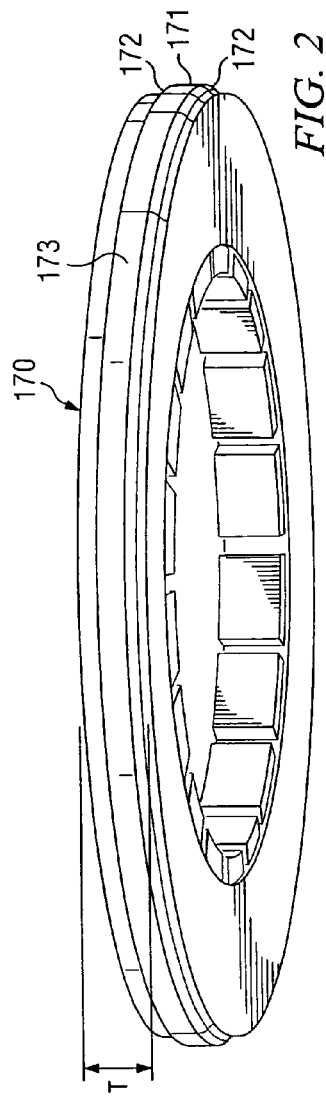
FIG. 2 is a perspective illustration of an example stator disc having a ring extending radially from an outer axial surface.

In the illustrated example, the mass or volume of the example brake disc assembly 140 is maximized by providing each example stator disc 170, the example pressure plate disc 180 and the example backing plate disc 190 with a respective radially extended ring 171, 181, or 191 of friction material. As shown in FIG. 2, the example stator disc 170 includes a radially extended ring 171 of friction material, which extends radially through curved surfaces 172 to an axial surface 173. The ring 171 shown in FIG. 2 has a width narrow enough so that the ring 171 will remain clear of adjacent brake components such as, for example, the metal inserts 168 of the adjacent rotor discs 160, including when the example stator disc 170 is in a worn condition. The ring 171 may be provided by manufacturing the example stator disc 170 to have initially a continuous disc thickness (e.g., the disc thickness T in FIG. 2) extending to an initial outer disc diameter surface that includes the axial surface 173, and then machining the initial outer disc diameter surface to remove friction material adjacent both sides of the example disc 170. The machining creates the pair of curved surfaces 172 each with a predetermined radius and also defines the axial surface 173.

Figure 3:
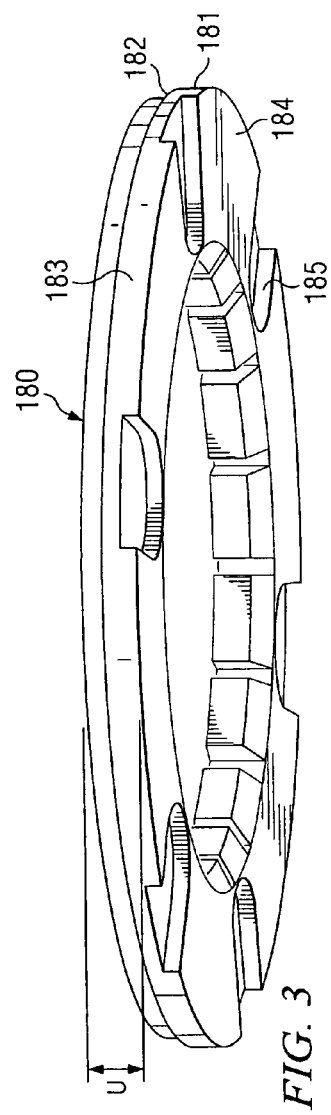
FIG. 3 is a perspective illustration of an example pressure plate disc having a ring extending radially from an outer axial surface.

As shown in FIG. 3, the example pressure plate disc 180 includes the radially extended ring 181 of friction material, which extends radially through a curved surface 182 to an axial surface 183. If the carbon brake 100 does not include the metal plate 150, the example pressure plate disc 180 includes, at a disc side 184, recesses 185 which extend radially through the ring 181 to receive the pistons 106. The axial surface 183 of the ring 181 has a width narrow enough so that the example pressure plate disc 180 will remain clear of the adjacent metal inserts 168 of an adjacent rotor disc 160, including when the example pressure plate disc 180 and the adjacent rotor disc 160 are in a worn condition. The ring 181 shown in FIG. 3 may be provided by manufacturing the example pressure plate disc 180 to have initially a continuous disc thickness (e.g., the disc thickness U in FIG. 3) extending to an initial outer disc diameter surface that includes the axial surface 183, and then machining the outer disc diameter surface opposite the disc side 184 to remove friction material. The machining creates the curved surface 182 with a predetermined radius and defines the axial surface 183.

Figure 4:
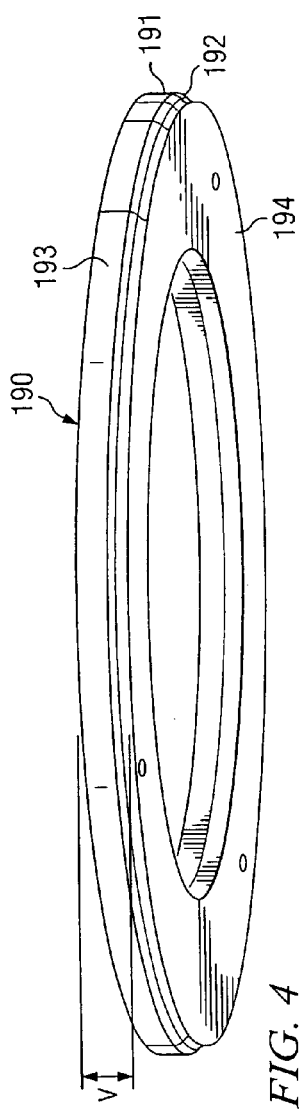
FIG. 4 is a perspective illustration of an example backing plate disc having a ring extending radially from an outer axial surface

As shown in FIG. 4, the example backing plate disc 190 includes the radially extended ring 191 of friction material, which extends radially through a curved surface 192 to an axial surface 193. The axial surface 193 of the ring 191 has a width narrow enough so that the example backing plate disc 190 remains clear of the adjacent metal inserts 168 of an adjacent rotor disc 160, including when the example backing plate disc 190 and the adjacent rotor disc 160 are in a worn condition. The ring 191 shown in FIG. 4 may be provided by manufacturing the example backing plate disc 190 to have initially a continuous disc thickness (e.g., the disc thickness V in FIG. 4) extending to an initial outer disc diameter surface that includes the axial surface 193, and then machining the outer disc diameter surface to remove friction material adjacent the disc side 194 of the example backing plate disc 190. The machining creates the curved surface 192 with a predetermined radius and defines the axial surface 193.

Figure 5A:
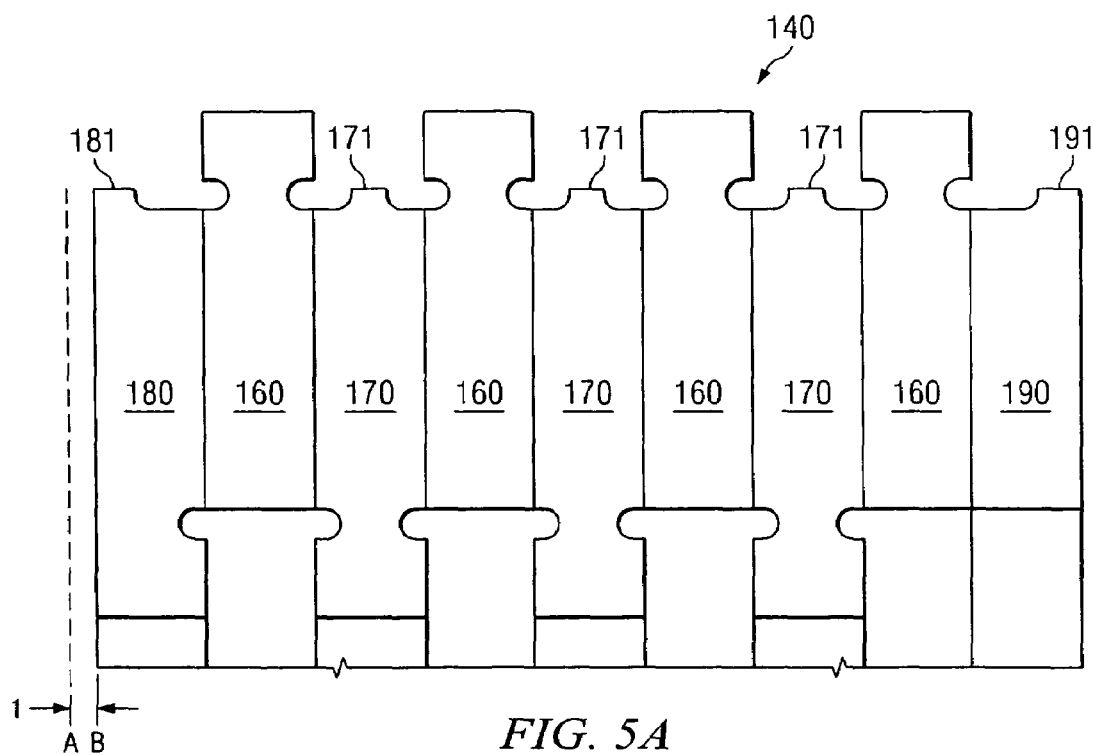
FIG. 5A is an example schematic illustration of the example brake disc assembly in an unworn condition.
Figure 5B:
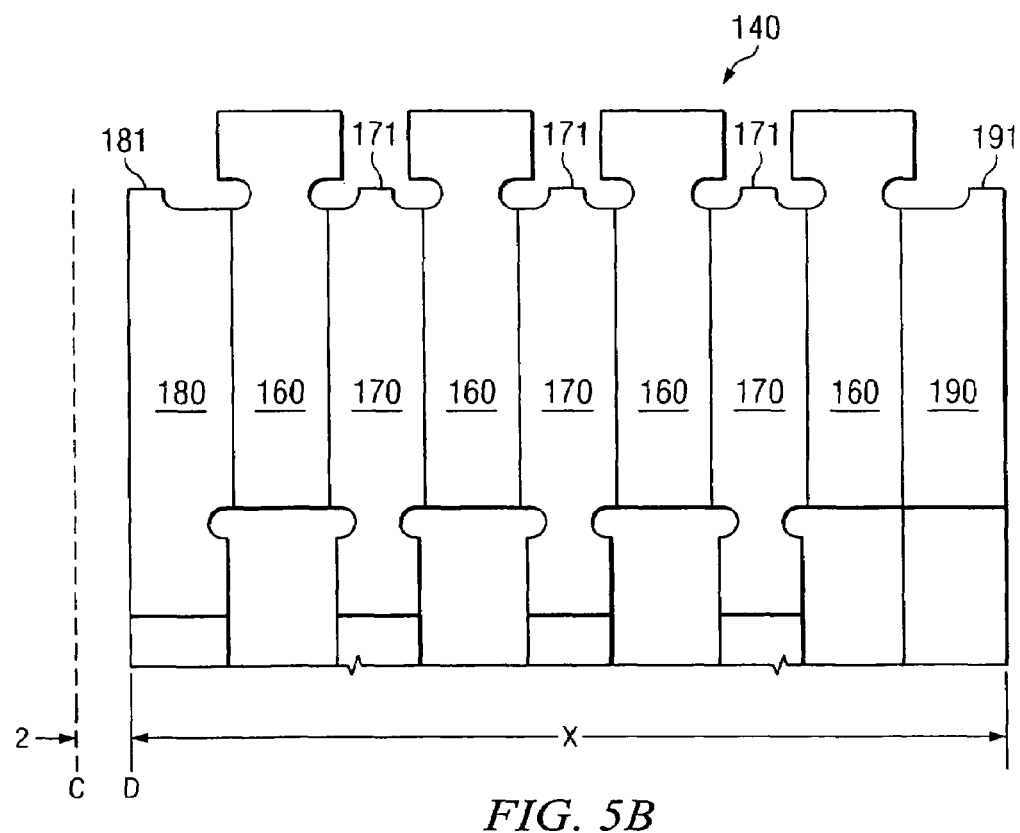
FIG. 5B is an example schematic illustration of the example brake disc assembly in a worn condition.

FIG. 5A is an example schematic illustration of the example brake disc assembly 140 of FIGS. 1-4 in an unworn condition, and FIG. 5B is an example schematic illustration of the example brake disc assembly 140 of FIGS. 1-4 in a worn condition. For ease of illustration in FIGS. 5 A and B, the example brake disc assembly 140 includes only three example stator discs 170 and four rotor discs 160, an example pressure plate disc 180 and an example backing plate disc 190. In FIG. 5A, the example pressure plate disc 180 includes the ring 181, the example backing plate disc 190 includes the ring 191, and the example stator discs 170 each include a respective ring 171. Referring to FIG. 5B, the use of the friction material rings 171, 181 and 191 on the example stator discs 170, the example pressure plate disc 180 and the example backing plate disc 190, respectively, enables an axial length X of the worn example brake disc assembly 140 to be shortened as compared to a worn brake disc assembly that does not include the friction material rings 171, 181 and 191. Additionally, because the worn axial length X is shortened, the discs 160, 170, 180 and 190 of the brake disc assembly 140 can be subjected to increased wear and, thus, provide a longer service life or LPO.

In FIG. 5B, the use of the friction material rings 171, 181 and 191 enables the rotor discs 160, the example stator discs 170, the example pressure plate disc 180 and the example backing plate disc 190 of the worn example brake disc assembly 140 to have smaller respective thicknesses, so that the worn axial length X is shortened. The shortened length X of the example brake disc assembly 140 requires that each of the pistons (not shown) of the brake (not shown) have a longer piston length, which corresponds to a longer piston stroke, in order to accomplish an increase in LPO. However, a piston with a longer stroke has a longer initial length that also requires the unworn axial length of the example brake disc assembly 140 to be reduced. In the example four rotor brake disc assembly 140 in FIG. 5A, an example amount of axial length that the unworn brake disc assembly 140 is shortened and, correspondingly, the piston is lengthened, is 0.082 inch. Furthermore, the corresponding example amount of the longer piston stroke is 0.082 inch. The example amount of the shortened length of the example brake disc assembly 140, or longer piston stroke, is illustrated in FIG. 5A as distance 1 between the lines A and B, where the line A represents the position of a pressure plate (not shown) in a brake disc assembly that does not utilize the rings 171, 181 and 191. Overall, when fully worn the brake disc assembly 140 can be an example amount of 0.164 inch shorter (illustrated as a distance 2 between the lines C and D in FIG. 5B) than a brake disc assembly not having the rings 171, 181 and 191. The distance 2 is approximately twice or double the distance 1 of the longer piston stroke shown between the lines A and B.

Additionally, it is advantageous to minimize the fully worn axial length of the example brake disc assembly 140 in FIG. 5B so that an associated torque tube will be shorter and an associated wheel may be more structurally efficient, both of which can reduce the weight of an associated wheel and brake assembly.

Due to the use of the rings 171, 181, and 191, when the discs 160, 170, 180 and 190 are fully worn the discs will have substantially the same total worn mass as a fully worn carbon brake disc assembly that does not have the friction material rings 171, 181, and 191. Therefore, although the example brake disc assembly 140 in FIG. 5B has a shortened worn axial length X as compared to a prior known brake assembly, the use of the friction material rings 171, 181 and 191 provides additional mass to satisfy worn brake performance requirements, and also enables the example brake disc assembly 140 to be used in service a desired longer period of time to provide an increased LPO.

Alternatively, the unworn axial length of the example brake disc assembly 140 of FIG. 5A may be reduced to the extent that the service life or LPO remains constant, or the unworn axial length may be reduced incrementally to provide a desired corresponding increase in LPO.

The example stator discs 170, the example pressure plate disc 180, and/or the example backing plate disc 190, and the respective radially extended rings 171, 181, or 191 may be manufactured by various methods. Three example methods of manufacture are described below. A first example manufacturing method includes the use of molded random carbon fiber to provide an example carbon brake disc. A quantity of chopped carbon fiber and molding compound are uniformly added to a preform die. A preform is formed by application of heat and by compression of the preform in the axial direction. The resulting preform is then used to form a molded carbon/phenolic disc by a compression molding process (eg., heat and pressure applied to the perform and a molding compound). The molded disc is then subjected to: (a) carbonization to convert the phenolic to carbon, (b) densification by chemical vapor deposition (CVD) into the porous molded disc, and (c) heat treatment (e.g., at 1600-2800° C.) to produce a carbon or graphite disc having a desired crystalline structure. The carbon-carbon composite disc is then machined to configure to the final dimensions. Numerous variations of the basic carbonization and densification processes may be utilized. Alternatively or additionally, the CVD process can be replaced by multiple cycles of char-forming liquid impregnation/carbonization to fill the pores of the composite with carbon. If a thermosetting resin (phenolic) or other compound is utilized, the carbonized disc is impregnated followed by curing and charring, and then the processes of impregnation, curing and charring are repeated until the desired carbon disc is provided. If pitch in the form of coal tar or petroleum is utilized, then the pitch is melted and impregnated into the carbon disc followed by charring. The charring may be effected under pressure. Whichever of the processes are utilized (CVD, thermosetting resin, pitch, etc.), the resulting carbon-carbon brake disc preferably contains a radially extended ring as an integral part of the disc structure.

A second example method of manufacturing the example stator disc, the example pressure plate disc and/or the example backing plate disc includes the fabrication of a molded, laminated fabric composite. In this example method of providing a carbon-carbon composite aircraft brake disc, the disc is manufactured as a molded, laminated woven or nonwoven fabric construction (e.g., layer-on-layer of carbon cloth/phenolic prepreg) in a manner similar to the manufacturing method described above. The fabric material is heated to a low temperature (e.g., less than 200° C.) to remove volatile compounds. Instead of utilizing a molding compound, the carbon cloth/prepreg of fabric material is shaped as annular rings or ring segments to prepare the preform. In particular, the prepreg is added to a preform die and the preform is then formed in the die. Disc molding and carbon-carbon processing is performed on the preform as described above. In this method, carbonization is performed at approximately 800-2800° C., and final heat treatment is performed at approximately 1600-2800° C. The heat treated disc is then machined to the desired shape and dimensions. The resulting carbon-carbon brake disc preferably contains a radially extended ring as an integral part of the disc structure.

A third example method of manufacturing the example stator, the example pressure plate and/or the example backing plate disc employs the use of nonwoven laminated fabric composites. Nonwoven laminated fabric preforms are prepared from multi-layers of randomly and/or specifically oriented mats which are reinforced in the through-thickness direction by textile processes such as, for example, needling, sewing or tufting. The resulting preforms have multi-directional reinforcement and are used as the precursor for subsequent processing into carbon-carbon composite brake discs. In the preparation of such preforms, it is possible to produce preforms in the general shape of the brake disc being manufactured. During the build-up of the preform, needling or other methods of achieving through-thickness reinforcement increase the structural strength of the preform. In this method, the nonwoven laminated fabric preform is subjected to carbon-carbon composite processing as discussed above. The interconnected layers or mats may receive a final heat treatment at a temperature of approximately 1600-2800° C. The disc is then machined to the desired shape and dimensions. The resulting carbon-carbon brake disc preferably contains a radially extended ring as an integral part of the disc structure.

Although the example manufacturing techniques described above produce carbon-carbon composite brake discs, a carbon or carbon composite brake disc may also be manufactured by other methods that produce other types of carbon composite brake discs such as, for example, a carbon fiber/ceramic matrix composite brake disc, or a carbon-ceramic fiber/ceramic matrix composite brake disc. A carbon or carbon composite brake disc includes composites such as the other types of example composites.

The example brake disc assembly 140 of the illustrated example aircraft carbon brake 100 is a balanced brake disc assembly (e.g., each rotor disc and stator disc has substantially the same thickness). When the rotor discs 160, the example stator discs 170, the example pressure plate disc 180 and the example backing plate disc 190 have been worn such that the assembly has an overall predetermined thickness for the example brake disc assembly 140, the example brake disc assembly 140 is removed from the example aircraft carbon brake 100 and replaced with an overhauled brake disc assembly. The overhauled brake disc assembly may include replacement rotor discs 160, replacement example stator discs 170, a replacement example pressure plate disc 180 and a replacement example backing plate disc 190 with appropriate unworn thicknesses.

Although not illustrated herein, a brake disc assembly having rotor discs and stator discs with significantly different thicknesses (e.g., a thick-thin brake disc assembly) could alternatively be employed using the teachings of this disclosure. In particular, a thick-thin brake disc assembly may utilize the radially extended rings 171, 181, or 191 disclosed herein. When the thin discs (e.g., rotor discs or stator discs) are worn to a thickness necessitating replacement, they are replaced at brake overhaul by new or refurbished thick discs, and the formerly thick discs (rotor discs or stator discs) may remain in the overhauled brake disc assembly as worn thin discs so they may be used for another brake service run.

Figure 6:
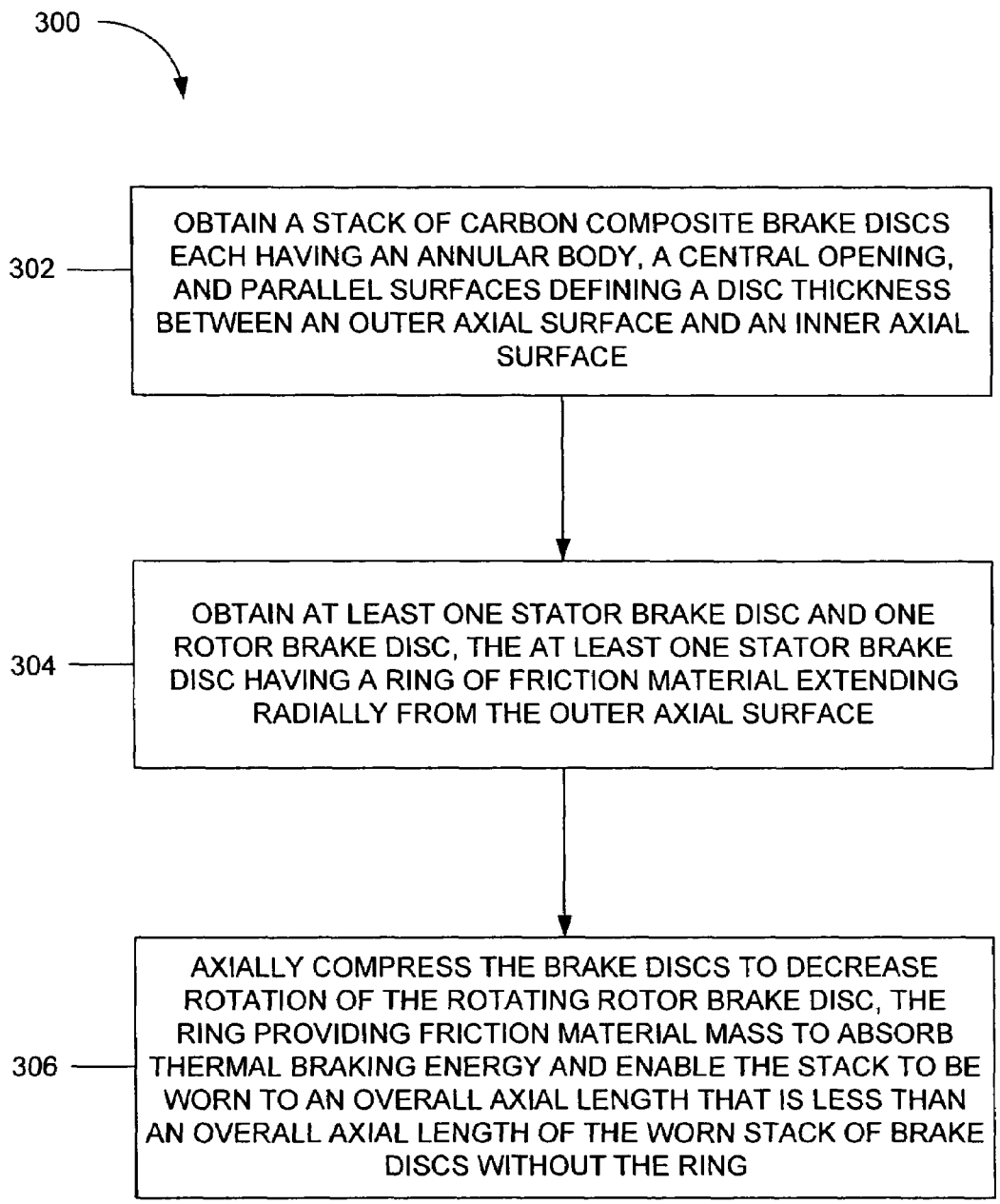
FIG. 6 is a flow diagram representative of an example method to increase the use of the friction material of a stack of carbon composite brake discs.

FIG. 6 is a flow chart representative of an example method 300 to increase the use of the friction material in a stack of carbon composite brake discs, and more particularly, to increase the use of friction material to improve the service life of a disc brake assembly containing the stack of carbon composite brake discs. Initially, a stack of carbon composite brake discs (e.g., the rotor discs 160, the example stator discs 170, the example pressure plate disc 180, and the example backing plate disc 190 in FIG. 1) are obtained. Each disc has an annular body, a central opening, and parallel surfaces defining a disc thickness between an outer axial surface and an inner axial surface, (block 302). At block 304, at least one stator brake disc (e.g., an example stator disc 170 in FIGS. 1 and 2, or the example pressure plate disc 180 in FIGS. 1 and 3, or the example backing plate disc 190 in FIGS. 1 and 4) and one rotor brake disc (e.g., one of the rotor discs 160 in FIG. 1) are obtained, and the at least one stator brake disc (e.g., the example stator disc 170 in FIGS. 1 and 2, or the example pressure plate disc 180 in FIGS. 1 and 3, or the example backing plate disc 190 in FIGS. 1 and 4) has a ring of friction material (e.g., the ring of friction material 171 in FIGS. 1 and 2, or the ring of friction material 181 in FIGS. 1 and 3, or the ring of friction material 191 in FIGS. 1 and 4) extending radially from the outer axial surface. Then, the brake discs (e.g., the rotor disc 160, an example stator disc 170, or the example pressure plate disc 180, or the example backing plate disc 190 in FIG. 1) are axially compressed during rotation of the rotor brake disc (e.g., one of the rotor discs 160 in FIG. 1) to decrease the rotation of the rotor brake disc, the ring (e.g., the ring of friction material 171 in FIGS. 1 and 2, or the example ring of friction material 181 in FIGS. 1 and 3, or the example ring of friction material 191 in FIGS. 1 and 4) providing friction material mass to absorb thermal braking energy and enable the stack to be worn to an overall axial length (e.g., the overall axial length X in FIG. 5B) that is less than an overall axial length of the worn stack of brake discs without the ring, (block 306).

The use of the friction material rings 171, 181, and 191 in the carbon brakes of an aircraft can provide an economic benefit to the operator of the aircraft. For example, in the example four rotor brake disc assembly 140 illustrated in FIG. 5A, the friction material ring 171 of the example stator disc 170 results in the weight of carbon friction material being increased by approximately 1.96% of the total stator disc weight. The friction material ring 181 on the example pressure plate disc 180 increases the carbon friction material weight by approximately 3.74% of the total pressure plate disc weight. The friction material ring 191 on the example backing plate disc 190 increases the carbon friction material weight by approximately 3.85% of the total backing plate disc weight. The example four rotor brake disc assembly 140, which includes rotor discs 160 and the example stator discs 170, the example pressure plate disc 180 and the example backing plate disc 190 containing the respective friction material rings 171, 181, and 191, has an increase in friction material weight of 1.21% of the total brake disc weight. As a result of these increases, the example four rotor brake disc assembly 140 may remain in service longer because an increased amount of friction material can be worn away during braking operations before replacement is required (e.g., the service life may be increased approximately 3.39%). The increased use of the friction material of the carbon composite brake discs for braking contributes to reducing an aircraft operator's cost of operating an aircraft equipped with brakes having carbon composite brake discs.

The example method illustrated in FIG. 6 can be used with either a balanced brake disc assembly or a thick-thin brake disc assembly. However, a balanced brake disc assembly can have overall fewer parts numbers than the overall part numbers used with a thick-thin brake disc assembly, which can reduce the number of parts to be tracked by an aircraft operator.

An example method and brake disc assembly are described with reference to the flowchart illustrated in FIG. 6. However, persons of ordinary skill in the art will readily appreciate that other methods may alternatively be used. For example, the order of execution of the blocks may be changed, and/or some of the blocks described may be changed, eliminated, and/or combined.

Although certain example methods and apparatus have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A carbon composite brake disc comprising:
   a generally annular body having an opening, an outer axial surface, an inner axial surface, a disc thickness extending axially at locations between the outer axial surface and the inner axial surface, and at least one ring extending radially from the outer axial surface to define an outermost diameter of the carbon composite brake disc, wherein the at least one ring defines a width in the direction of the disc thickness smaller than the disc thickness, wherein:
   the at least one ring defines the outermost diameter of the carbon composite brake disc by a radially extended axial surface that projects radially away from the outer axial surface of the carbon composite brake disc and is joined to the outer axial surface by at least one curved surface, and
   an outer diameter of the carbon composite brake disc, as defined at the outer axial surface of the carbon composite brake disc, excluding the portions forming the at least one ring and the at least one curved surface, is configured to remain constant between a first, unworn state and a second, fully worn state.

2. The carbon composite brake disc of claim 1, wherein the carbon composite brake disc comprises a stator disc.

3. The carbon composite brake disc of claim 1, wherein the carbon composite brake disc is at least one of a pressure plate disc or a backing plate disc.

4. The carbon composite brake disc of claim 1, wherein the carbon composite brake disc comprises a carbon-carbon composite aircraft brake disc.

5. The carbon composite brake disc of claim 1, wherein the at least one ring is an integral part of the carbon composite brake disc.

6. The carbon composite brake disc of claim 1, wherein the inner axial surface includes a plurality of radially extending openings to engage coupling members.

7. The carbon composite brake disc of claim 6, wherein the coupling members are splines at a torque tube of a brake.

8. A braking mechanism comprising:
a carbon composite stator brake disc; and
a carbon composite rotor brake disc, wherein the stator brake disc comprises a ring of friction material extending radially from an outer axial surface of the carbon composite stator brake disc, the ring providing friction material mass to absorb thermal energy created during braking and defining a ring width in a direction of a disc thickness of the carbon composite stator brake disc smaller than the disc thickness, wherein:
the ring defines an outermost diameter of the carbon composite stator brake disc by a radially extended axial surface that projects radially away from the outer axial surface of the carbon composite stator brake disc and is joined to the outer axial surface of the carbon composite stator brake disc by at least one curved surface of the carbon composite stator brake disc, and
an outer diameter of the carbon composite stator brake disc, as defined at the outer axial surface of the carbon composite stator brake disc, excluding the portions forming the ring and the at least one curved surface of the carbon composite stator brake disc, is configured to remain constant between a first, unworn state and a second, fully worn state.

9. The brake mechanism of claim 8, wherein the ring is an integral part of the stator brake disc.

10. The brake mechanism of claim 8, wherein the braking mechanism further includes a plurality of stator brake discs and rotor brake discs, and each stator brake disc includes a ring of friction material extending radially from the respective outer axial surface.

11. The friction mechanism of claim 8, wherein the ring of friction material enables the brake discs to be worn to an overall axial length that is less than an overall axial length of the worn brake discs without the ring of friction material.

12. A braking method comprising:
axially compressing a carbon composite stator brake disc and a carbon composite rotor brake disc during rotation of the carbon composite rotor brake disc to decrease the rotation of the carbon composite rotor brake disc, wherein the carbon composite stator brake disc comprises a ring of friction material extending from an outer axial surface of the carbon composite stator brake disc, the ring defining a ring width in a direction of a stator disc thickness of the stator brake disc, the ring width being smaller than the stator disc thickness, and the ring providing friction material mass to absorb thermal energy created during the compression of the brake disc, wherein:
the ring defines an outermost diameter of the carbon composite stator brake disc by a radially extended axial surface that projects radially away from the outer axial surface of the carbon composite stator brake disc and is joined to the outer axial surface by at least one curved surface of the carbon composite stator brake disc, and
an outer diameter of the carbon composite stator brake disc, as defined at the outer axial surface of the carbon composite stator brake disc, excluding the portions of the ring of friction material and the at least one curved surface of the carbon composite stator brake disc, is configured to remain constant between a first, unworn state and a second, fully worn state.

13. The method of claim 12, wherein the carbon composite stator brake disc is a carbon-carbon composite brake disc.

14. The method of claim 12, wherein axially compressing the carbon composite stator brake disc and the carbon composite rotor brake disc during rotation of the rotor brake disc to decrease the rotation of the rotor brake disc comprises axially compressing a plurality of carbon composite stator brake discs and a plurality of carbon composite rotor brake discs during rotation of the plurality of carbon composite rotor brake discs to decrease the rotation of the plurality of carbon composite rotor brake discs, each carbon composite stator brake disc of the plurality of carbon composite stator brake discs comprising a ring of friction material extending radially from the respective outer axial surface.

15. The method of claim 12, wherein the ring is an integral part of the stator brake disc.

16. The method of claim 12, wherein the stator brake disc is at least one of a pressure plate brake disc or a backing plate brake disc.

17. The method of claim 12, wherein the stator brake disc has a plurality of radially extended openings disposed to engage the stator brake disc with coupling member.

18. The method of claim 12, wherein the ring enables the carbon composite stator and rotor brake discs to be worn to an overall axial length that is less than an overall axial length of the worn carbon composite stator and rotor brake discs without the ring of friction material.

* * * * *